US006971966B2

(12) United States Patent
Gibson et al.

(10) Patent No.: US 6,971,966 B2
(45) Date of Patent: Dec. 6, 2005

(54) BELT DAMPER

(75) Inventors: Robert C. Gibson, Peoria, IL (US); Kevin J. Knox, Peoria, IL (US); Marvin P. Schneider, East Peoria, IL (US); Michael J. Smith, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/692,395

(22) Filed: Oct. 23, 2003

(65) Prior Publication Data

US 2004/0132568 A1 Jul. 8, 2004

Related U.S. Application Data

(62) Division of application No. 09/940,122, filed on Aug. 27, 2001, now abandoned.

(51) Int. Cl.[7] .................... F16H 57/04; F16H 7/12
(52) U.S. Cl. .................. 474/91; 474/72; 474/117; 474/75
(58) Field of Search .................. 74/409, 412 R, 74/413, 574; 474/133, 135, 138, 144, 148, 474/900, 72–75, 91, 117

(56) References Cited

U.S. PATENT DOCUMENTS

| 81,285 A | 8/1868 | Patton |
|---|---|---|
| 952,156 A | 3/1910 | Trewhella |
| 1,497,226 A | 6/1924 | Pitts |
| 1,808,728 A | 6/1931 | Mitchell |
| 2,631,422 A | 3/1953 | Michaelson |
| 4,019,397 A | 4/1977 | Bochan |
| 4,236,448 A | 12/1980 | Wieland |
| 4,257,370 A | 3/1981 | Kasting |
| 4,373,483 A * | 2/1983 | Bury ................. 123/198 C |
| 4,493,571 A | 1/1985 | Potter |
| 5,085,619 A | 2/1992 | Torii et al. |
| 5,122,098 A | 6/1992 | Kanehira |
| 5,480,358 A | 1/1996 | Sakai et al. |
| 5,569,106 A | 10/1996 | Splittstoesser et al. |
| 5,687,612 A | 11/1997 | Imamura |
| 5,702,315 A | 12/1997 | Sakai et al. |
| 5,720,685 A | 2/1998 | Malone |
| 5,733,218 A | 3/1998 | Sudau et al. |
| 5,735,768 A | 4/1998 | Sudau |
| 5,860,328 A | 1/1999 | Regueiro |
| 5,931,052 A | 8/1999 | Zhao et al. |
| 6,074,294 A | 6/2000 | Stevenson |
| 6,117,016 A | 9/2000 | Nett et al. |

FOREIGN PATENT DOCUMENTS

JP        57127150 A    8/1982

* cited by examiner

*Primary Examiner*—Marcus Charles
(74) *Attorney, Agent, or Firm*—Marshall, Gerstein & Borun LLP

(57) ABSTRACT

A belt damper for a gear train is provided. An endless belt is wrapped around pulleys mounted to an idler gear and an output gear. The pulleys are mounted to splined shafts which are axially aligned with and connected to splined gear shafts on which the idler and output gears are mounted. Pressurized lubricant is supplied to both splined connections. The combination of the lubricant in the spline connections and the damping effect of the belt provides for an effective damping system. A tension device may also be applied to vary tension imposed on the belt.

20 Claims, 5 Drawing Sheets

BELT DAMPER

This is a divisional application of U.S. patent application Ser. No. 09/940,122, filed Aug. 27, 2001, now abandoned.

TECHNICAL FIELD

This invention relates generally to dampers for gear trains and, more particularly, to belt dampers with and without tensioning devices for gear trains.

BACKGROUND

Damping systems for gear trains are known. Typical damping systems for gear trains include the use of a flywheel mounted to one of the gear shafts. U.S. Pat. No. 6,117,016 discloses such a flywheel that is equipped with a damper mechanism that consists of an elastomeric material. Other systems have a centrifugal mass that is connected to a hub which, in turn, is connected to a crankshaft. In other systems, a vibration damper is connected to the crankshaft and a vibrational damper mechanism has a gear train.

The above mechanisms have been shown to be deficient in terms of both cost of manufacture, installation requirements and limited effectiveness. Accordingly, there is a need for an improved damper mechanism for a gear train that requires a limited number of additional parts, a limited redesign of the gear train itself and which has a proven effectiveness and further which can be easily adjusted.

SUMMARY OF THE INVENTION

In one aspect of the invention a damper for a gear train has an output gear mounted to an output shaft, a first idler gear and a second idler gear connected to an idler shaft. The first idler gear is disposed between and enmeshed with the output gear and the second idler gear. The damper mechanism has an output pulley mounted on an output pulley shaft. The output pulley shaft is axially aligned with and connected to the output shaft by a first spline connection. A second idler pulley is mounted to a second idler pulley shaft. The second idler pulley shaft is axially aligned with and connected to the idler shaft with a second spline connection. An endless belt is wrapped around the output pulley and second idler pulley. A first lubricant fitting connects a supply of lubricant to the first spline connection and a second lubricant fitting connects a lubricant to the second spline connection.

In another aspect of the present invention a dampened gear train which has an output gear mounted to an output shaft is disclosed. The output shaft extends through the output gear and has a distal end that has a first female splined hole. A second idler gear is mounted to an idler shaft. The idler shaft extends through the second idler gear and has a distal end having a second female splined hole. An output pulley is mounted to a splined output pulley shaft that extends into the first splined female hole. A second idler pulley is mounted to a splined second idler pulley shaft that extends into the second splined female hole of the idler shaft. A first idler gear is disposed between and enmeshed with the output and second idler gears. An endless belt is wrapped around the output and second idler pulleys. A lubricant fitting is connected to the distal end of the output shaft and supplies lubricant to the first splined female hole. And, a second lubricant fitting is connected to the distal end of the idler shaft supplying lubricant to the second splined female hole.

In another aspect of the present invention a method of damping a gear train that includes an output gear mounted to an output shaft, a first idler gear and a second idler gear mounted to an idler shaft is disclosed. The first idler gear is disposed between and enmeshed with the output gear and second idler gear. The method has the steps of providing an output pulley mounted to an output pulley shaft. The output pulley shaft is axially aligned with the output shaft and connected thereto by a first spline connection. Providing a second idler pulley mounted to a second idler pulley shaft. The second idler pulley shaft is axially aligned with the idler shaft and connected thereto by a second spline connection. Providing an endless belt wrapped around the output pulley and second idler pulley, providing a first lubricant fitting connecting a first supply of lubricant to the first spline connection, providing a second lubricant fitting connecting a second supply of lubricant to the second spline connection and, injecting lubricant into the first and second spline connections through the first and second lubricant fittings respectively.

DETAILED DESCRIPTION

Figure 1:
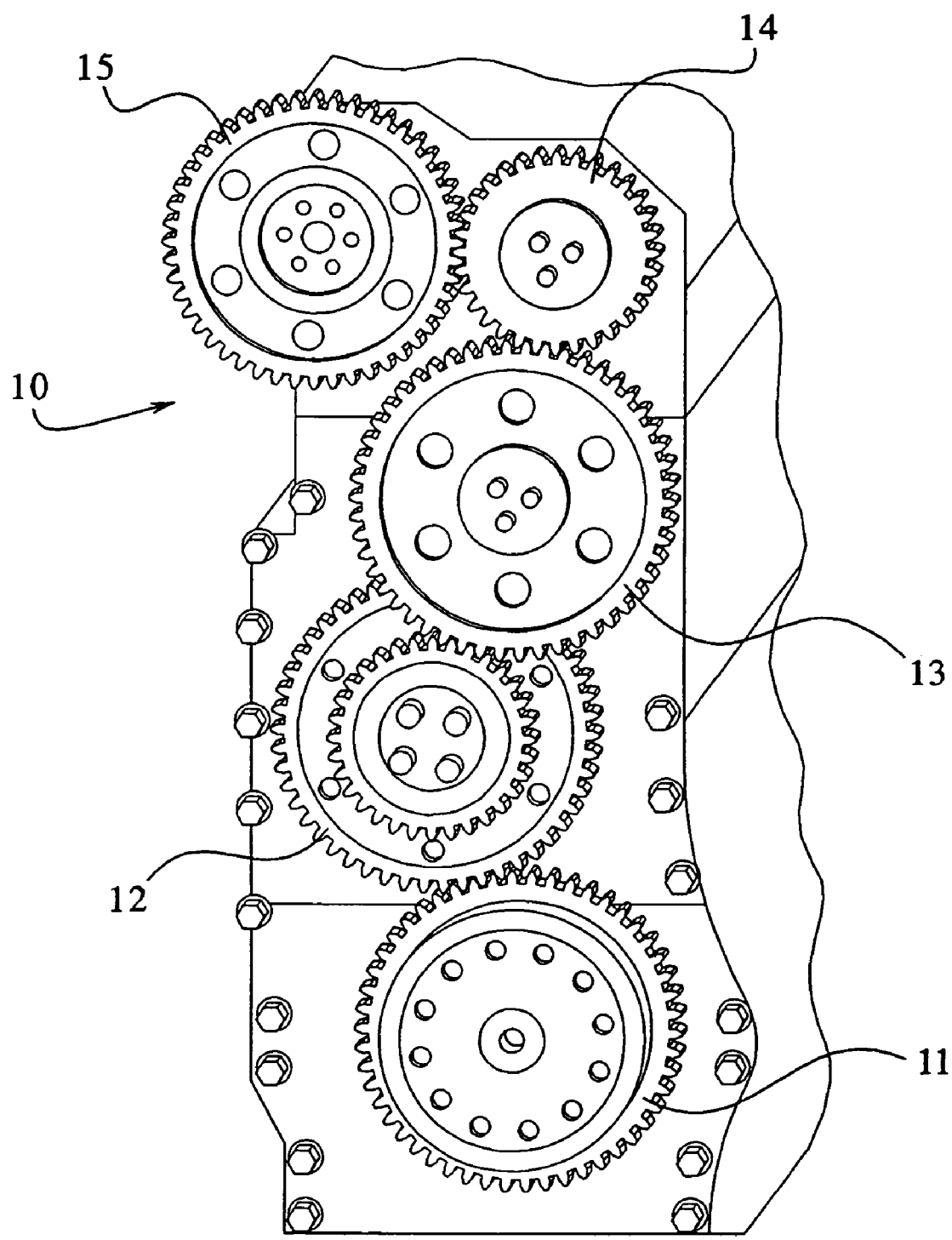
FIG. 1 is a perspective view of a gear train capable of being modified with the damping mechanism of the present invention.

Referring now to FIG. 1, a gear train 10 is illustrated for a fuel injection system. It will be noted, however, that the damping mechanism of the present invention can be applied to any gear train and the invention is not limited to a specific application such as a fuel injection system. An input or crank gear 11 is enmeshed with an idler gear 12 which, in turn, is enmeshed with another idler gear 13. The second idler gear 13 is enmeshed with a first idler gear 14 which is disposed between and enmeshed with the second idler 13 and an output or cam gear 15.

Figure 2:
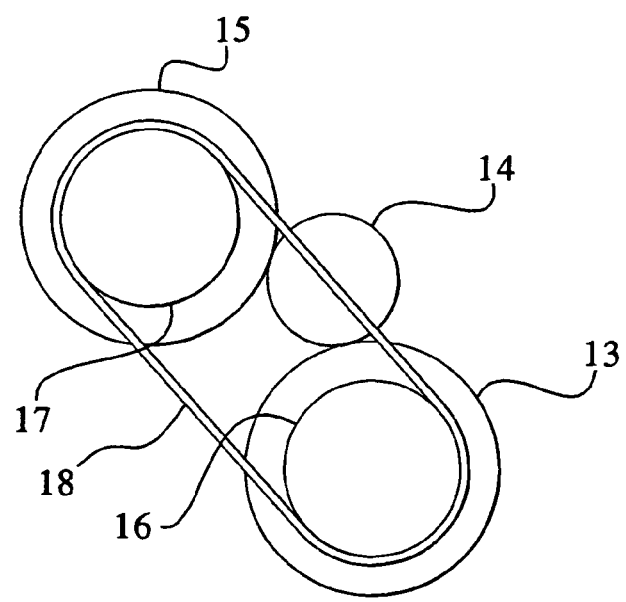
FIG. 2 is a schematic plan view of a damping mechanism made in accordance with the present invention.

As shown in FIG. 2, a second idler pulley 16 is mounted to the second idler gear 13. Similarly, an output pulley 17 is mounted to the output gear 15. An endless belt 18 is wrapped around the second idler pulley 16 and output pulley 17.

Figure 4A:
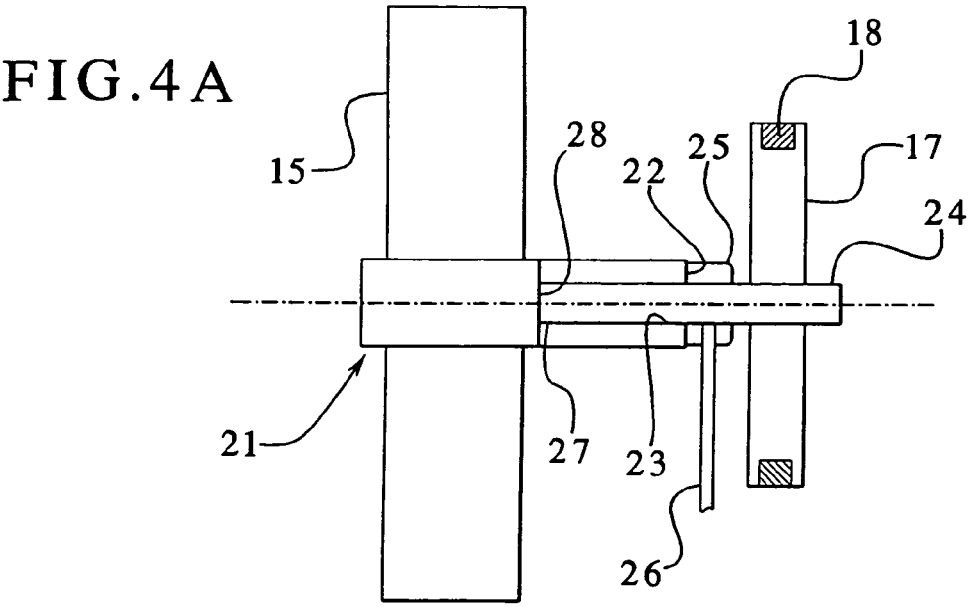
FIG. 4A is a schematic sectional view of a spline connection between an output pulley shaft and an output shaft or, in the alternative, a second idler pulley shaft and an idler shaft in accordance with the present invention.

As shown in FIG. 4A, the output gear 15 is mounted to an output shaft 21. The output shaft 21 includes a distal end 22 which features a female splined hole 23. An opposite end of the shaft 21 may be coupled to a part of a fuel injection system such as a fuel injection pump shown schematically at 29.

Figure 3:
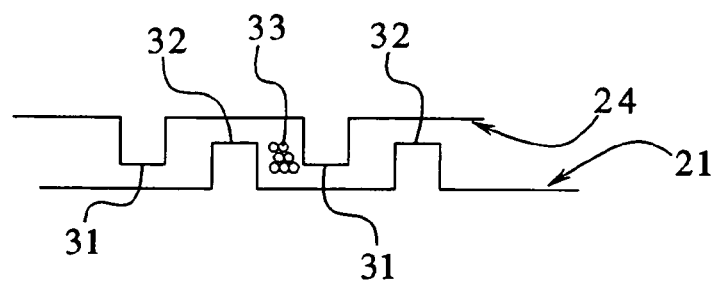
FIG. 3 is a schematic illustration of lubricant disposed between spline elements of two shafts connected with a spline connection in accordance with the present invention.

The output pulley 17 is similarly mounted to an output pulley shaft 24 which is also splined and which is received within the splined female hole 23 of the output shaft 21. A lubricant fitting 25 is shown connected to a lubricant supply 26. Lubricant, under pressure, is supplied through the fitting 25 to the distal end 22 of the output shaft 21 and into the female splined hole 23. A bleed port 27 is positioned at an end wall 28 of the female hole 23. Thus, lubricant can constantly be supplied from the lubricant supply 26 through the splined hole 23. FIG. 3 is an enlarged view of the mating connection between the output pulley shaft 24 and the output shaft 21. Both shafts include a spline 31, 32 respectively and a lubricant 33 is constantly disposed between the splines of the respective shafts 21, 24.

Referring again to FIG. 4A, the connection between the second idler pulley 16 and second idler gear 13 can be the same or similar to the configuration shown in FIG. 4A and, hence, a separate drawing is not provided. The second idler pulley 16 is mounted to a second idler pulley shaft. The second idler gear 13 is also mounted to a second idler shaft. The second idler shaft passes through the second idler gear 13 and has a distal end with a splined female hole that receives a splined end of the second idler pulley shaft. The spline connection as illustrated in FIG. 4A or a similar connection can be employed. A lubricant fitting is also utilized to provide a supply of lubricant to the spline connection.

Also, the spline connection illustrated in FIGS. 3 and 4A maybe necessary for one pulley only, the other pulley could be simply bolted to its respective gear. Alternative/spline connections are also illustrated in FIGS. 4B and 4C.

Figure 4B:
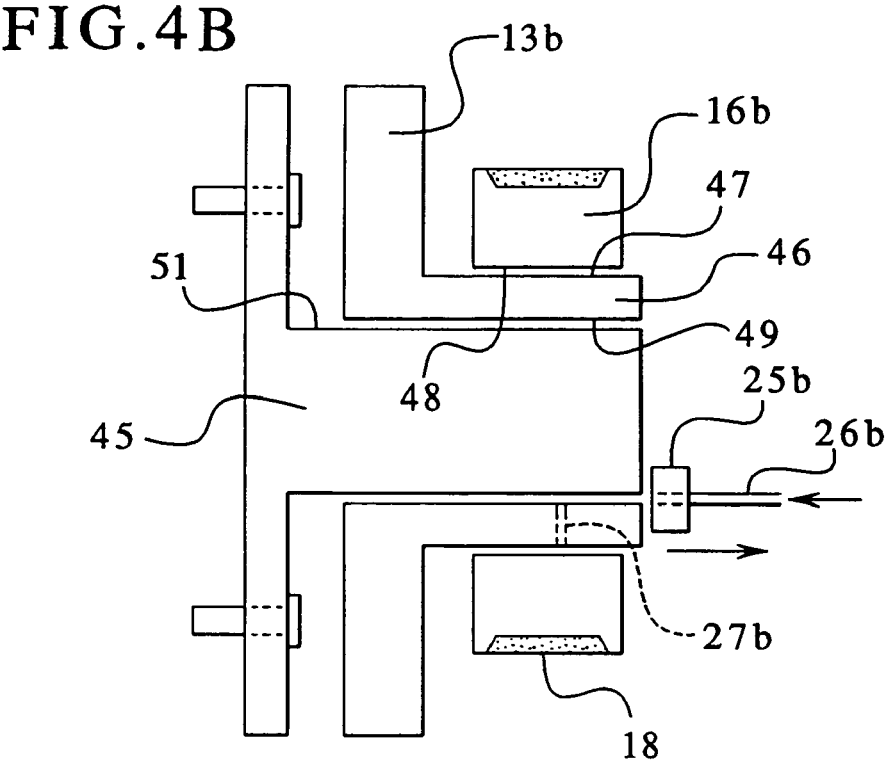
FIG. 4B is a schematic sectional view of an alternative spline connection between an output pulley shaft and an output shaft or, in the alternative, a second idler pulley shaft and an idler shaft in accordance with an alternative embodiment of the present invention.

Specifically, referring to FIG. 4B, a stationary stub shaft 45 is shown. An idler gear 13b is mounted over the shaft 45. The idler gear 13b is equipped with a splined extension 46 which has a splined exterior surface 47 which is connected to a splined interior surface 48 of an idler pulley 16b. A lubricant fitting 25b is shown which enables lubricant to be injected from a supply 26b and between the splined interior surface 49 of the extension 46 and the splined exterior surface 51 of the stub shaft 45. Communication is provided between the space defined by the interior splined surface 49/exterior splined surface 51 and the interior surface 48/exterior surface 47 by a port 27b thereby providing lubricant to the spline connection between the surfaces 47, 48.

Figure 4C:
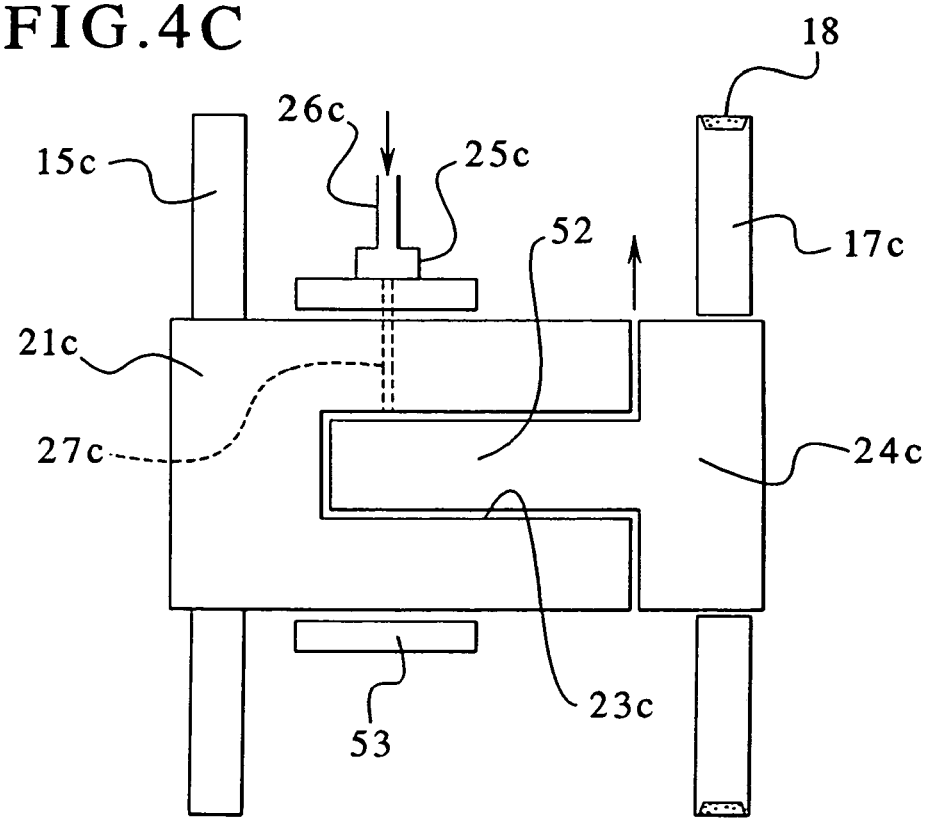
FIG. 4C is a schematic sectional view of a spline connection between an output pulley shaft and an output shaft or, in the alternative, a second idler pulley shaft and an idler shaft in accordance with the present invention.

FIG. 4C illustrates a gear 15c fixedly mounted to a shaft 21c. A pulley 17c is fixedly mounted to a pulley shaft 24c. The shaft 21c includes a splined hole 23c that terminates at the end wall 28c and which receives a splined portion 52 of a pulley shaft 24c. A stationary bearing sleeve 53 is connected to a lubricant fitting 25c and the port 27c provides communication between a supply 26c, the fitting 25c and the splined connection between the shaft 24c and shaft 21c. The embodiment illustrated in FIG. 4C is applicable to a crank shaft, cam shaft and all other devices that utilize journal bearings. The embodiment in FIG. 4B is applicable to numerous devices whereby a rotating gear is mounted to a stationary shaft 45. Numerous other arrangements for the placement of the splined connection between the pulley and gear and for the placement of the lubricant fitting, supply port and bleed port will be apparent to those skilled in the art.

Figure 5:
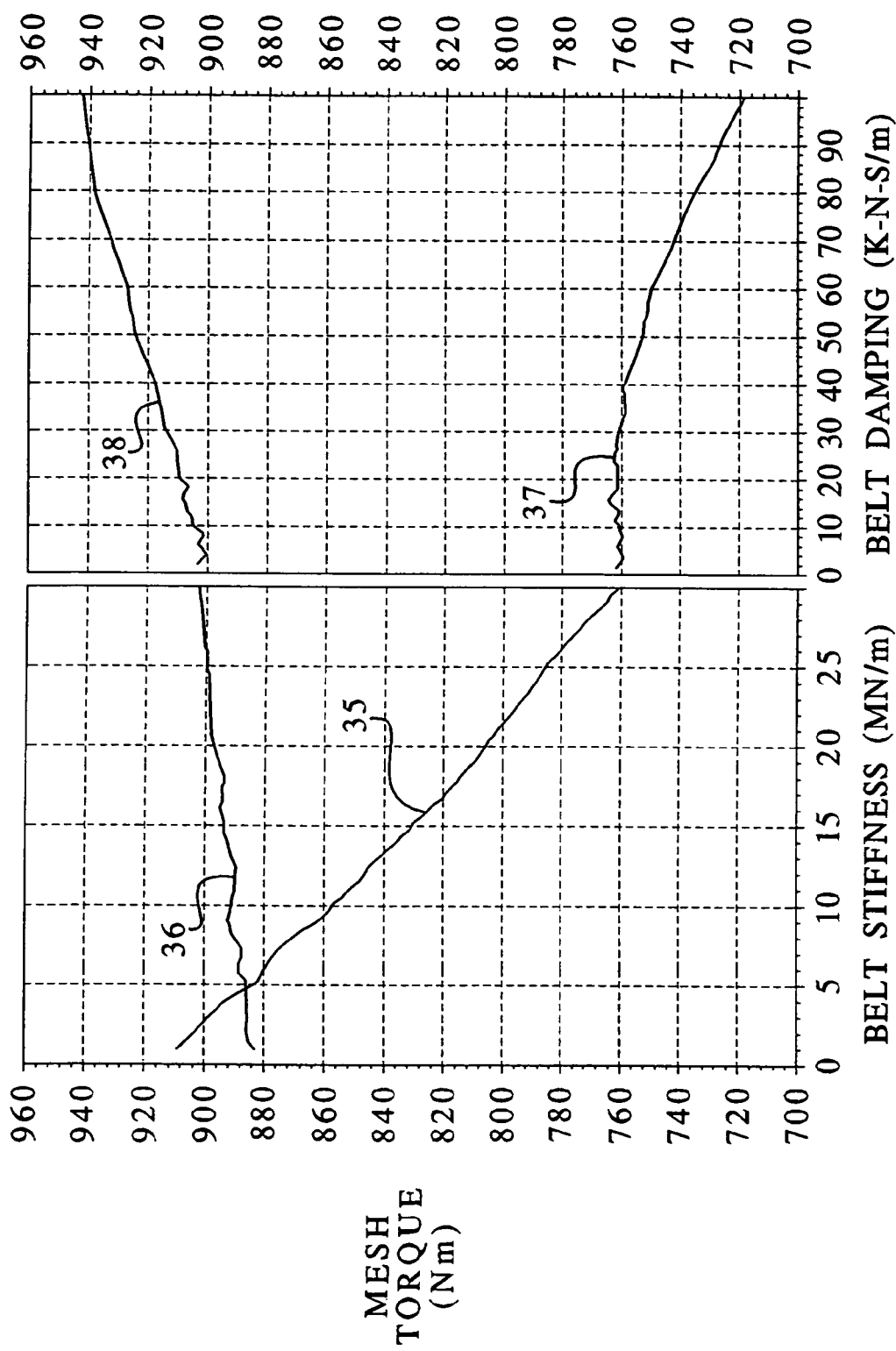
FIG. 5 is a graphical illustration of the effectiveness of the damping mechanism of the present invention in reducing mesh torque at the cam gear while not drastically increasing mesh torque at the input or crank gear.

FIG. 5 illustrates, graphically, the effectiveness of the damping mechanism of the present invention which includes a combination of an endless belt wrapped around pulleys mounted to an output shaft and a second idler shaft and lubricant spline connections between the pulley shafts and the output and idler shafts. Specifically, comparing the graphical lines 35, 36 on the left side of FIG. 5, increasing the belt stiffness from at or near zero to a stiffness of about 30 mega Newtons per meter (MN/m) results in a substantial decrease in the mesh torque at the cam or output gear 15 from about 900 Newton meters (Nm) to about 760 Newton meters as shown by line 35.

This dramatic decrease in mesh torque at the output gear 15 results in only a slight increase in mesh torque at the crank or input gear from about 880 Newton meters to about 900 Newton meters as shown by line 36. Thus, an optimum belt stiffness can be found in the range from about 20 mega Newtons per meter to about 30 mega Newtons per meter.

Similarly, on the right side of FIG. 5, an increase in the belt damping at the cam or output gear 15, as shown by line 37, results in a decrease in the mesh torque experienced at the output gear 15 but also results in an increase in the mesh torque experienced at the input or crank gear 11 as exemplified by line 38. Thus, depending upon the acceptable mesh torque at the crank gear 11, an optimum belt damping range can be found. If it is desired to keep the mesh torque below 920 Newton meters at the input gear 11, the belt damping should be restricted to a range between 10 and 40 kilo Newtons seconds per meter.

The reader will note that the data shown in FIG. 5 is for exemplary purposes only and that actual belt stiffness, belt damping and mesh torque will vary greatly for various applications. Thus, the data shown in FIG. 5 is not intended to be indicative of all applications of the disclosed damper.

Figure 6:
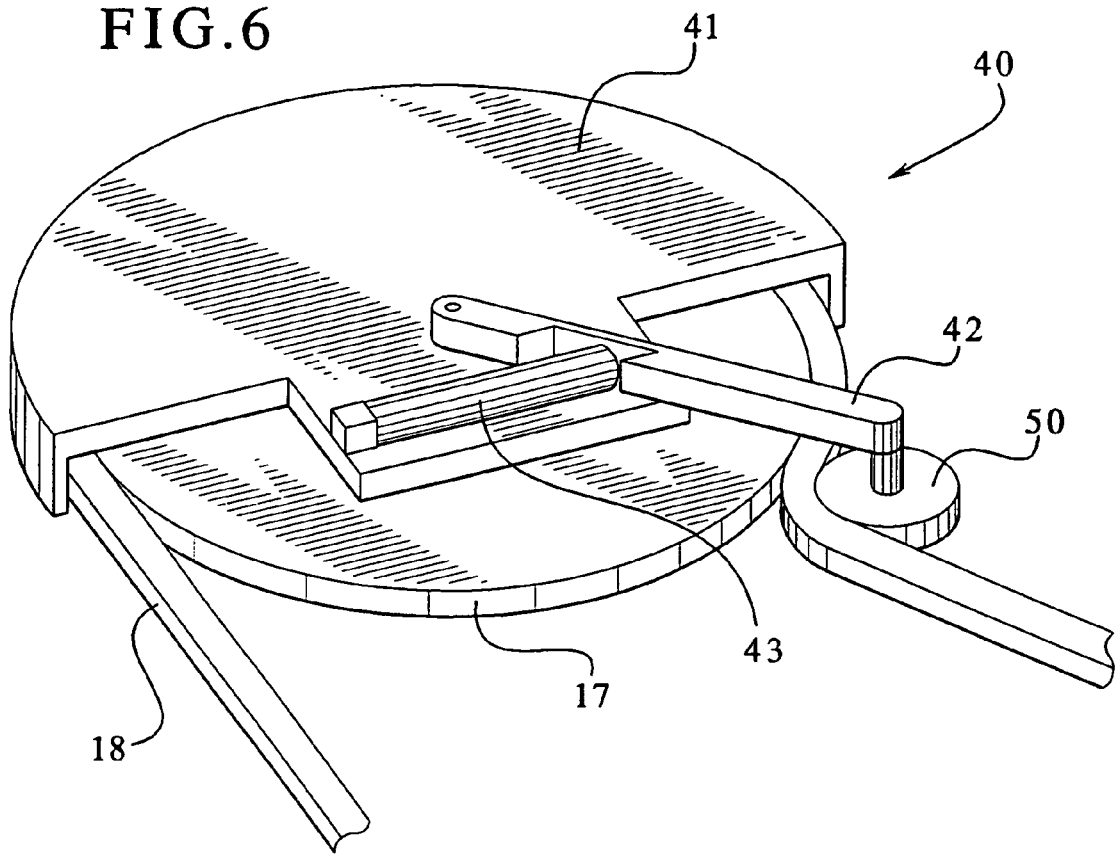
FIG. 6 is a partial perspective view of a tensioning mechanism for applying tension to the belt of the damping mechanism of the present invention.
Figure 7:
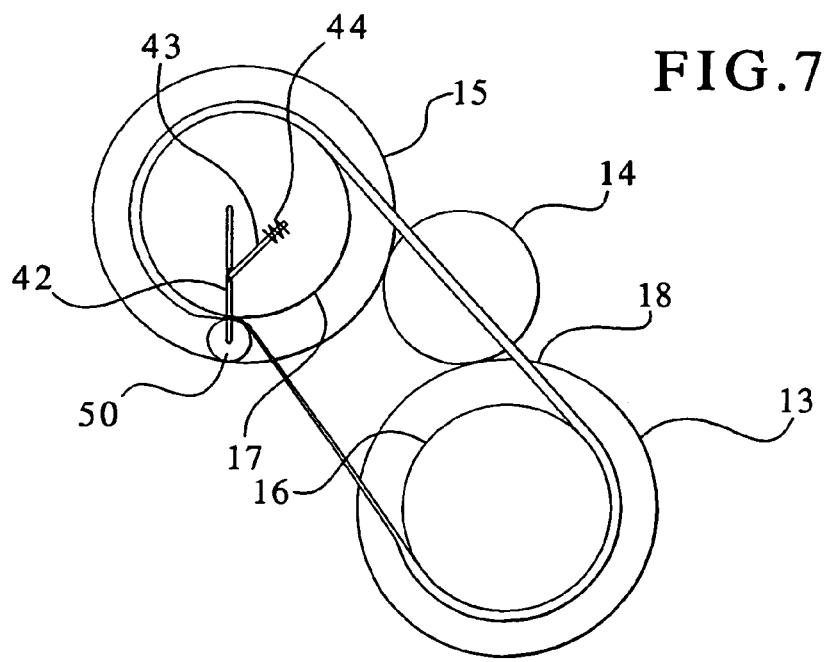
FIG. 7 is a schematic illustration of a damping mechanism made in accordance with the present invention equipped with a belt tensioning mechanism.

Turning to FIG. 6, a tensioning device 40 is illustrated. The device 40 includes a restraining shield 41 that is connected to the output pulley 17. It will also be noted that the tensioning device 40 can be mounted to the second idler pulley 16 as well. A tension arm 42 is pivotally mounted to the shield 41 and pulley 17. The position of the arm is controlled by an actuator 43, which, in one embodiment, can be a jack screw. The actuator 43 also preferably includes a spring 44 as shown in FIG. 7 to allow some dynamic response in the tension arm 42. The tension arm 42 is connected to a tension pulley 50 which engages the belt 18. A schematic illustration of the tension device 40 without the shield 41 is also provided in FIG. 7. The tensioning device 40 can be used to reduce lash (or clearances) in the gear train.

INDUSTRIAL APPLICABILITY

Referring to FIG. 1, it is clearly evident that the belt damper mechanism of the present invention can be applied to a gear train associated with a fuel injection system. Other applications will be apparent to those skilled in the art.

The combination of the belt and the lubricant supplied to the first and second spline connections provides an effective damping mechanism which reduces the mesh torque experienced at the output gear while not dramatically increasing the mesh torque experienced at the input or crank gear.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A dampened gear train comprising:
   an output gear mounted to an output shaft, the output shaft extending through the output gear and includes a distal end having a first female splined hole that terminates at a closed end within the output shaft,
   a second idler gear mounted to an idler shaft, the idler shaft extending through the second idler gear and has a distal end that having a second female splined hole that terminates at a closed end within the idler shaft,
   an output pulley mounted to a solid splined cam pulley shaft that extends into the first splined female hole,
   a second idler pulley mounted to a solid splined second idler pulley shaft that extends into the second splined female hole,
   a first idler gear disposed between and enmeshed with the output and second idler gears,
   an endless belt wrapped around the output and second idler pulleys,
   a first lubricant fitting connected to the distal end of the output shaft for supplying lubricant to the first splined female hole,
   a second lubricant fitting connected to the distal end of the idler shaft for supplying lubricant to the second splined female hole.

2. The dampened gear train of claim 1 wherein the first and second lubricant fittings are connected to at least one pressurized lubricant supply.

3. The dampened gear train of claim 1 wherein a first bleed port is disposed at the closed end of the first splined female hole.

4. The dampened gear train of claim 1 wherein a second bleed port is disposed at the closed end of the second splined female hole.

5. The dampened gear train of claim 1 including a tensioner which engages the belt.

6. The dampened gear train of claim 5 wherein the tensioner includes a tensioner pulley that engages the belt.

7. The dampened gear train of claim 6 wherein the tensioner pulley is connected to a tensioner arm that is connected to one of the output and second idler pulleys.

8. The dampened gear train of claim 7 including a jack screw that engages the tensioner arm.

9. The dampened gear train of claim 6 wherein one of the output and second idler pulleys is connected to a shield and the tensioner pulley is connected to a tensioner arm that is connected to the shield.

10. The dampened gear train of claim 1 wherein the output shaft is connected to an output of a fuel injection pump.

11. The dampened gear train of claim 1 further comprising an input gear and a third idler gear, the third idler gear disposed between an enmeshed with both the second idler gear and the input gear.

12. The dampened gear train of claim 1 wherein the first idler gear has a radius, the second idler gear has a radius and the output gear has a radius, the radius of the first idler gear being smaller than the radii of the output gear and the second idler gear.

13. A dampened gear train comprising:
    an output gear mounted to an output shaft, the output shaft extending through the output gear and includes a distal end having a first female splined hole that terminates at a closed end within the output shaft,
    a second idler gear mounted to an idler shaft, the idler shaft extending through the second idler gear and has a distal end that having a second female splined hole that terminates at a closed end within the idler shaft,
    an output pulley mounted to a solid splined cam pulley shaft that extends into the first splined female hole,
    a second idler pulley mounted to a solid splined second idler pulley shaft that extends into the second splined female hole,
    a first idler gear disposed between and enmeshed with the output and second idler gears,
    an endless belt wrapped around the output and second idler pulleys,
    a first lubricant fitting connected to the distal end of the output shaft for supplying lubricant to the first splined female hole,
    a second lubricant fitting connected to the distal end of the idler shaft for supplying lubricant to the second splined female hole,
    an input gear and a third idler gear, the third idler gear disposed between an enmeshed with both the second idler gear and the input gear.

14. The dampened gear train of claim 13 wherein the first idler gear has a radius, the second idler gear has a radius and the output gear has a radius, the radius of the first idler gear being smaller than the radii of the output gear and the second idler gear.

15. The dampened gear train of claim 13 wherein the first and second lubricant fittings are connected to at least one pressurized lubricant supply.

16. The dampened gear train of claim 13 wherein a first bleed port is disposed at the closed end of the first splined female hole.

17. The dampened gear train of claim 13 wherein a second bleed port is disposed at the closed end of the second splined female hole.

18. The dampened gear train of claim 13 including a tensioner which engages the belt.

19. The dampened gear train of claim 18 wherein the tensioner includes a tensioner pulley that engages the belt.

20. The dampened gear train of claim 10 wherein one of the output and second idler pulleys is connected to a shield and the tensioner pulley is connected to a tensioner arm that is connected to the shield.

* * * * *